United States Patent
Koizumi

(10) Patent No.: US 9,057,533 B2
(45) Date of Patent: Jun. 16, 2015

(54) DUCT

(71) Applicant: JSP CORPORATION, Tokyo (JP)

(72) Inventor: Tatsuya Koizumi, Kanuma (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 14/264,591

(22) Filed: Apr. 29, 2014

(65) Prior Publication Data

US 2014/0339013 A1     Nov. 20, 2014

(30) Foreign Application Priority Data

May 14, 2013   (JP) ................. 2013-101875

(51) Int. Cl.
| | |
|---|---|
| *E04F 17/04* | (2006.01) |
| *F01N 1/24* | (2006.01) |
| *F24F 13/24* | (2006.01) |
| *B29C 49/00* | (2006.01) |
| *B60H 1/00* | (2006.01) |
| *E04F 17/00* | (2006.01) |
| *F01N 1/00* | (2006.01) |
| *B29K 23/00* | (2006.01) |
| *B29K 105/04* | (2006.01) |

(52) U.S. Cl.
CPC ........... *F24F 13/24* (2013.01); *F24F 2013/242* (2013.01); *B29K 2995/0064* (2013.01); *B29K 2023/00* (2013.01); *B29C 49/0005* (2013.01); *B29K 2105/04* (2013.01); *B60H 1/00564* (2013.01)

(58) Field of Classification Search
CPC ............. B60H 1/26; B60H 1/24; F24F 13/24; F24F 2013/242

USPC .......... 181/224, 225, 252, 256, 247; 454/906, 454/262, 346; 138/141, 137; 428/36.5, 428/35.7, 34.1

See application file for complete search history.

(56) References Cited

U.S. PATENT DOCUMENTS

| | | | | |
|---|---|---|---|---|
| 4,615,411 A | * | 10/1986 | Breitscheidel et al. | ....... 181/224 |
| 4,874,649 A | * | 10/1989 | Daubenbuchel et al. | ..... 428/36.5 |
| 5,714,227 A | * | 2/1998 | Sugawara et al. | ............... 428/71 |
| 5,795,634 A | * | 8/1998 | Fukui | .......................... 428/36.1 |
| 6,251,320 B1 | * | 6/2001 | Hansel et al. | ................ 264/46.1 |
| 6,432,525 B1 | * | 8/2002 | Gokuraku et al. | ......... 428/318.6 |
| 7,014,801 B2 | * | 3/2006 | Imanari et al. | ............... 264/45.9 |
| 7,169,338 B2 | * | 1/2007 | Imanari et al. | ............... 264/45.9 |

(Continued)

FOREIGN PATENT DOCUMENTS

| | | |
|---|---|---|
| JP | A-6-156051 | 6/1994 |
| JP | 2004-116956 | 4/2004 |

(Continued)

OTHER PUBLICATIONS

Jul. 17, 2014 Search Report issued in European Patent Application No. 14167332.7-1706.

*Primary Examiner* — Edgardo San Martini
(74) *Attorney, Agent, or Firm* — Oliff PLC

(57) ABSTRACT

A duct of a foamed blow-molded article that is constituted of a polyolefin-based resin with a bending elastic modulus of 800-1,300 MPa, that has an average apparent density (D) of 0.1 to 0.4 g/cm³ and an average thickness (T) [cm] providing $D \times T^2$ of 0.005 to 0.04 g/cm, and that has an outer surface side region and an inner surface side region having an average apparent density lower than that of the outer surface region.

8 Claims, 6 Drawing Sheets

(56) References Cited

U.S. PATENT DOCUMENTS

| | | | |
|---|---|---|---|
| 8,186,387 B2 * | 5/2012 | Wadsworth | 138/149 |
| 8,435,615 B2 * | 5/2013 | Tsuchida et al. | 428/36.5 |
| 8,448,671 B2 * | 5/2013 | Onodera et al. | 138/141 |
| 8,517,059 B2 * | 8/2013 | Onodera et al. | 138/149 |
| 8,535,598 B2 * | 9/2013 | Imanari et al. | 264/540 |
| 8,667,995 B1 * | 3/2014 | Fanelli | 138/112 |
| 8,783,414 B2 * | 7/2014 | Gaiser | 181/252 |
| 2003/0051764 A1 * | 3/2003 | Jungers | 138/149 |
| 2004/0166269 A1 * | 8/2004 | Imanari et al. | 428/36.5 |
| 2006/0211355 A1 | 9/2006 | Kutter-Schrader et al. | |
| 2007/0031622 A1 * | 2/2007 | Imanari et al. | 428/36.5 |
| 2013/0052377 A1 * | 2/2013 | Tani et al. | 428/34.1 |
| 2013/0164474 A1 * | 6/2013 | Igarashi et al. | 428/36.5 |
| 2013/0273281 A1 * | 10/2013 | Luo et al. | 428/35.7 |
| 2014/0171533 A1 * | 6/2014 | Koizumi et al. | 521/139 |

FOREIGN PATENT DOCUMENTS

| | | |
|---|---|---|
| JP | A-2004-116959 | 4/2004 |
| WO | 2012/083422 A1 | 6/2012 |

* cited by examiner

DUCT

BACKGROUND OF THE INVENTION

1. Field of the Invention

The present invention relates to a duct, and more particularly, to a duct that can be used for installation in vehicles.

2. Description of Prior Art

In general, ducts are installed at prescribed locations in vehicles, such as automobiles. For example, air conditioner ducts are installed behind the instrument panel and above the ceiling in an automobile. In a vehicle in which an air conditioner duct (in other words, a duct for a vehicle air conditioners) is installed as described above, the air blown out of the air conditioner mounted in the vehicle is directed through the space in the duct to outlets in the cabin.

Different vehicles have different shapes and structures, and the ducts are required to have a wide variety of shapes and structures according to the variations of vehicles. To meet the requests, hollow blow-molded articles made of a resin material have been favorably used for ducts. In this case, blow-molded articles employed are made of a non-foam resin.

As for ducts, there are problems of noise, such as a problem of leakage of the sound from the compressor of the vehicle air conditioner or the whistling sound of air flowing through the ducts into the cabin through the ducts and a problem of transmission of vehicle exterior noise or engine sound from the engine room into the cabin through the ducts. Thus, ducts having sound deadening properties have been desired. In this respect, a technique has been proposed to provide a duct having sound deadening properties by bonding a sound absorbing material to an outer surface of a duct (Japanese patent publication No. JP-A-H06-156051).

In addition, with recent increasing demand for weight reduction and compact structural design of vehicles, there is an increasing demand for ducts that are lighter in weight and have sound deadening properties. Thus, a technique has been proposed to use, for a duct, a foamed blow-molded article which is lighter in weight than that of a non-foam resin blow-molded article and excels in sound deadening properties (Japanese patent publication No. JP-A-2004-116959).

SUMMARY OF THE INVENTION

As for vehicles, in addition to the increasing demand for weight reduction and compact structural design, the demand for more comfort in the cabins is growing and the reduction of unpleasant noise is more than ever required. Further, because of the introduction of the idling stop technology and the spread of hybrid vehicles (HV) and electric vehicles (EV), situations where the sound of an air conditioner compressor or the whistling sound of air are easily recognized in the cabin, such as when the engine is stopped by the idling stop system or when an HV or EV runs on the electric motor mounted thereon, are increasing. It is, therefore, demanded to reduce such noise to a higher degree. Thus, there is an increasing possibility that the problem of noise cannot be sufficiently solved by the technique of P-A-2004-116959, let alone the technique of JP-A-H06-156051, and the provision of a duct light in weight and having sound deadening properties is in strong demand.

It is, therefore, an object of the present invention to provide a duct that is light in weight and excellent in sound deadening properties.

In accordance with one aspect of the present invention resides, there is provided:

(1) A duct comprising a foamed blow-molded article constituted of a polyolefin-based resin having a bending elastic modulus of 800 MPa or higher and 1,300 MPa or lower, said foamed blow-molded article having an average apparent density (D) of 0.1 $g/cm^3$ or higher and 0.4 $g/cm^3$ or lower, and an average thickness (T) [cm], wherein the product ($D \times T^2$) of the average apparent density (D) and the square of the average thickness (T) of said foamed blow-molded article is 0.005 g/cm or higher and 0.04 g/cm or lower, wherein said foamed blow-molded article has an inner surface side region having an average apparent density (D1) and an outer surface side region having an average apparent density (D2), and wherein a ratio (D1/D2) of the average apparent density (D1) to the average apparent density (D2) is lower than 1.

In further aspects, the present invention provides:

(2) A duct according as recited in (1) above, wherein the average thickness (T) of said foamed blow-molded article is 0.2 cm or greater;

(3) A duct as recited in (1) or (2) above, wherein the average apparent density (D) of said foamed blow-molded article is 0.13 $g/cm^3$ or higher and 0.22 $g/cm^3$ or lower;

(4) A duct as recited in any one of (1) to (3) above, wherein the polyolefin-based resin is a mixture of a polypropylene-based resin and an olefin-based elastomer, and the proportion of the olefin-based elastomer based on the polyolefin-based resin is 5% by weight or higher and 20% by weight or lower;

(5) A duct as recited in any one of (1) to (4) above, wherein said foamed blow-molded article has an average cell diameter (d), as measured in the thickness direction thereof, of 0.05 mm or greater and 0.5 mm or smaller, and wherein the inner surface side region of said foamed blow-molded article has an average cell diameter (d1) [mm], as measured in the thickness direction thereof, and the ratio (d1/d) of the average cell diameter (d1) to the average cell diameter (d) is higher than 1;

(6) A duct as recited in any one of (1) to (5) above, wherein said foamed blow-molded article has at least one flat surface portion, and has an average distance between parting portions opposed to each other of 40 mm or greater and 200 mm or smaller and an average blow ratio of 0.1 or higher and lower than 0.5;

(7) A duct as recited in any one of (1) to (6) above, wherein the product ($D \times T^2$) of the average apparent density (D) of said foamed blow-molded article and the square of the average thickness (T) [cm] of said foamed blow-molded article is 0.005 g/cm or higher and 0.03 g/cm or lower; and (8) A duct as recited in any one of (1) to (7) above, wherein the ratio (D1/D2) of the average apparent density (D1) of the inner surface side region of said foamed blow-molded article to the average apparent density (D2) of the outer surface side region of said foamed blow-molded article is 0.9 or lower.

According to the present invention, a duct that is light in weight and has excellent sound deadening properties is provided. The term "sound deadening properties" as used herein refers to a concept including both the ability to absorb sound and the ability to block the transmission of sound.

BRIEF DESCRIPTION OF THE DRAWINGS

Other objects, features and advantages of the present invention will become apparent from the detailed description of the preferred embodiments of the invention, which follows, when considered in light of the accompanying drawings, in which.

DETAILED DESCRIPTION OF THE PREFERRED EMBODIMENT OF THE INVENTION

Duct 1

Figure 1:
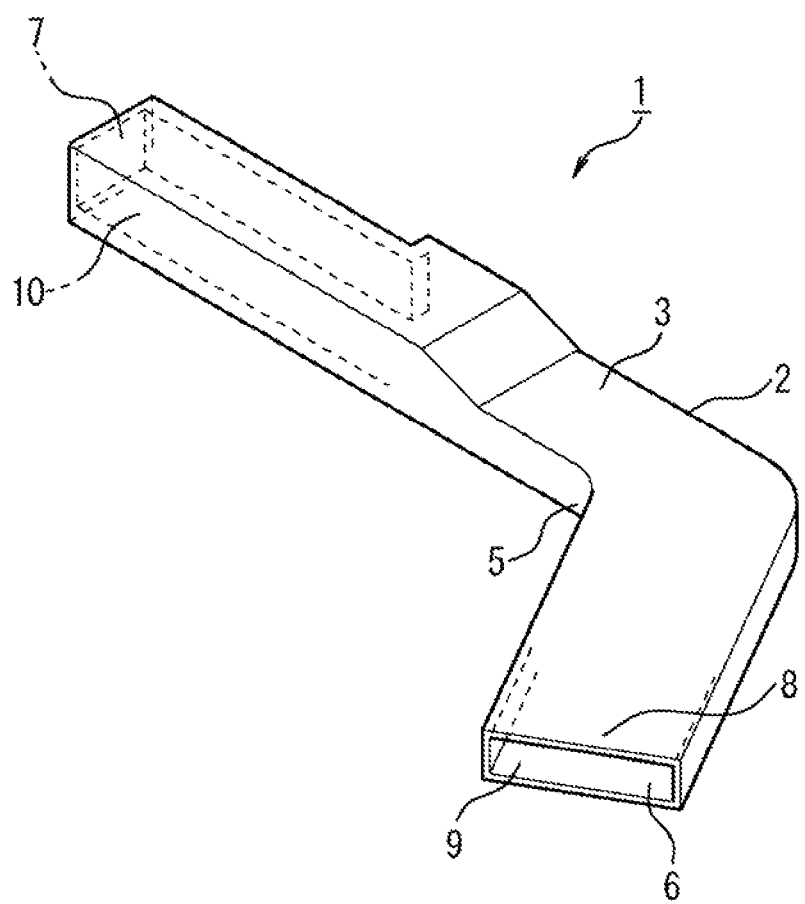
FIG. 1 is a perspective diagram schematically illustrating a duct according to one embodiment of the present invention.

Referring to FIG. 1, designated generally as 1 is a duct 1 according to an embodiment of the present invention. The duct 1 has a hollow tubular duct body 2 and may be optionally provided with one or more conventional parts and fittings such as mounting members to fix the duct 1 to an automobile (not shown), if necessary. The duct body 2 is constituted of a foamed blow-molded article described in detail below. Thus, the duct 1 of the present invention comprises a foamed blow-molded article 2.

Foamed Blow-Molded Article 2

The foamed blow-molded article 2 constituting the duct 1 has an internal space 10, and is made of a material containing a polyolefin-based resin as a base resin.

Polyolefin-Based Resin

The polyolefin-based resin forming the foamed blow-molded article 2 is a polymer having an olefin component content of at least 50 mole %, preferably at least 60 mole %, more preferably 80 to 100 mole %, based on the polyolefin-based resin. Examples of the polyolefin-based resin include homopolymers of an olefin, copolymers of different olefins, copolymers of an olefin with a comonomer copolymerizable with the olefin (the olefin component content of the copolymers should fall within the above range), and mixtures of the above-described polyolefin homopolymers and/or copolymers with additional polymer or polymers other than polyolefin (the olefin component content of the mixtures should fall within the above range). More specific examples of the polyolefin-based resin include polyethylene-based resins such as high density polyethylene, medium density polyethylene, low density polyethylene and linear low density polyethylene; and polypropylene-based resins such as homopolymer of propylene (propylene homopolymer), propylene-ethylene copolymers, propylene-butene copolymers and propylene-ethylene-butene copolymers. As the additional polymers which may be blended with the polyolefin homopolymers and/or copolymers, there may be mentioned, for example, olefin elastomers such as butadiene rubber (BR), ethylene-propylene rubber (EPR), ethylene-propylene-diene rubber (EPDM) and ethylene-octene copolymers; styrene elastomers such as styrene-butadiene-styrene block copolymers (SBS), styrene-isoprene-styrene block copolymers (SIS) and hydrogenated products thereof (SEBS, SEPS, etc.); and thermoplastic resins other than the above-described polyolefin homopolymers and/or copolymers such as polystyrene-based resins.

The polyolefin-based resin constituting the foamed blow-molded article 2 preferably contains at least 50% by weight or more of a high density polyethylene or a polypropylene-based resin from the standpoint of heat resistance and mechanical properties such as strength, and more preferably is composed mainly of a polypropylene-based resin. The expression "the polyolefin-based resin constituting the foamed blow-molded article 2 is composed mainly of a polypropylene-based resin" means that the propylene component units are present in an amount of 50 mole % or more in the polyolefin-based resin.

From the standpoint of improving the sound deadening properties of the foamed blow-molded article 2, the polyolefin-based resin constituting the foamed blow-molded article 2 preferably contains an olefin-based elastomer in an amount of 5% by weight or higher and 20% by weight or lower based on the polyolefin-based resin.

If desired, an additive or additives such as a flame retardant, a fluidity improver, a UV absorbing agent, an electrical conductivity imparting agent, an antistatic agent, a colorant, a thermal stabilizer, an antioxidant and an inorganic filler may be also added in an appropriate amount to the polyolefin-based resin constituting the foamed blow-molded article 2.

Bending Elastic Modulus and Average Apparent Density (D)

The polyolefin-based resin constituting the foamed blow-molded article 2 has a bending elastic modulus of 800 MPa or higher and 1300 MPa or lower, and an average apparent density (D) of 0.1 $g/cm^3$ or higher and 0.4 $g/cm^3$ or lower. A foamed blow-molded article made of the polyolefin-based resin having a bending elastic modulus in the above range and having an average apparent density (D) in the above range has a good balance between rigidity and lightness in weight and can be therefore favorably used for a duct.

Method for Measuring Bending Elastic Modulus

The bending elastic modulus of the polyolefin-based resin constituting the foamed blow-molded article 2 is a value measured in accordance with JIS K7171(1994). A sample for measurement is used to measure the bending elastic modulus. Specifically, the sample for measurement is prepared as described below, for example. The foamed blow-molded article 2 or a portion thereof is defoamed under heat (in a temperature range in which the mechanical properties of the base resin are not impaired) to prepare a defoamed body. The defoamed body is then subjected to hot press to convert it into a pressed body. At this time, the pressed body must have a thickness defined as the thickness of the sample. Then, a piece having dimensions specified as the dimensions (length× width) of the sample is cut out from the pressed body to prepare a sample for measurement.

Method for Measuring Average Apparent Density (D)

The average apparent density (D) [$g/cm^3$] of the foamed blow-molded article 2 is a value obtained by the following method. At the outset, seven measuring sites, at which the apparent density is to be measured, are selected in the foamed blow-molded article 2 as follows. The foamed blow-molded article 2 is cut along seven lines extending in a direction perpendicular to the direction in which air flows through the duct 1 formed from the foamed blow-molded article 2 (hereinafter referred to as "air flow direction"). The seven lines include two lines (P1 and P7 in FIG. 2A and FIG. 2B) drawn in the vicinity of both ends of the foamed blow-molded article 2 in a direction perpendicular to the air flow direction, and five lines (P2 to P6 in FIG. 2A) drawn to divide the portion between the lines P1 and P7 into six parts with generally the same length in the air flow direction. The seven measuring sites are located on the lines P1 to P7, respectively. More specifically, either one of the two cross-sections along each of the lines P1 to P7 is chosen as one measuring site. Incidentally, the dashed-dotted line M in FIG. 2A and FIG. 2B indicates the center line of the internal space of the foamed blow-molded article 2 along the longitudinal direction of the foamed blow-molded article 2. In the case of the molded article shown in FIG. 2A and FIG. 2B, the air flow direction is generally along the line M.

Next, on each of the seven chosen cross-sections along the lines P1 to P7 (namely in each of the seven measuring sites), two points generally opposed to each other with respect to the internal space 10 of the foamed blow-molded article 2 are selected. Thus, fourteen points are selected in total. Then, samples (nearly square in shape) each having an area of approximately 10 cm$^2$ and a thickness equal to that of the foamed blow-molded article 2 are cut out from the walls of the divided parts of the foamed blow-molded article 2 in such a way that each sample includes the cross-section at its selected point. Because two samples are taken for each of the seven cross-sections, fourteen samples are prepared in total. The apparent density (Wi/Vi) of each sample is obtained by dividing its weight Wi [g] by its volume Vi [cm$^3$], and the arithmetic mean of the fourteen measured values is employed as the average apparent density (D). The volume of each sample can be obtained by measuring its external dimensions or submerging it into water in a measuring cylinder.

Average Thickness (T)

The foamed blow-molded article 2 preferably has an average thickness (T) of 0.2 cm or greater, more preferably 0.23 cm or greater. An average thickness of the foamed blow-molded article 2 of smaller than 0.2 cm is not preferred because the foamed blow-molded article 2 may have an extremely small thickness in a portion with a high blow ratio.

Method for Measuring Average Thickness (T)

The term "average thickness" of the foamed blow-molded article 2 as used herein refers to the average wall thickness of the foamed blow-molded article 2, and is a value measured by the following method. The thickness of the foamed blow-molded article 2 is measured at seven measuring sites (on cross-sections taken along the lines P1 to P7) selected in the same manner as that employed in the above-described method for measuring the average apparent density (D). The thickness in the thickness direction of each of the seven measuring sites is measured at eight locations spaced apart at generally regular intervals along the circumference of each vertical cross-section. Thus, the thickness is measured at fifty-six (56) locations in total. Then, the arithmetic mean of the thicknesses measured at the fifty-six locations is calculated, and the arithmetic mean is employed as the average thickness (T) of the foamed blow-molded article 2. The thickness of the foamed blow-molded article 2 at each location is suitably determined by photographing an enlarged image of the cross-section under a microscope or the like, measuring, on the image, the length of the foamed blow-molded article 2 in the thickness direction at the center in the widthwise direction of the image, and dividing the measured value by the magnification of the enlarged image.

D×T$^2$ Value of Foamed Blow-Molded Article 2

The foamed blow-molded article 2 is formed such that the product (D×T$^2$) of its average apparent density (D) [g/cm$^3$] and the square of its average thickness (T) [cm] is 0.005 g/cm or higher and 0.04 g/cm or lower.

Range of D×T$^2$ Value

When the D×T$^2$ value is in the above range, a sufficient sound deadening effect may be obtained. When the D×T$^2$ value is too small, the rigidity of the foamed blow-molded article 2 constituting the duct 1 tends to be insufficient. In view of these respects, the foamed blow-molded article 2 constituting the duct 1 preferably has a D×T$^2$ value of 0.005 g/cm or higher and 0.03 g/cm or lower, more preferably 0.01 g/cm or higher and 0.025 g/cm or lower. From the standpoint of sound deadening properties, it is preferred that the foamed blow-molded article 2 has, in addition to a D×T$^2$ value in the above range, an average apparent density (D) of 0.13 g/cm$^3$ or higher and 0.22 g/cm$^3$ or lower, more preferably 0.15 g/cm$^3$ or higher and 0.2 g/cm$^3$ or lower.

Average Apparent Density Ratio (D1/D2)

Figure 2A:
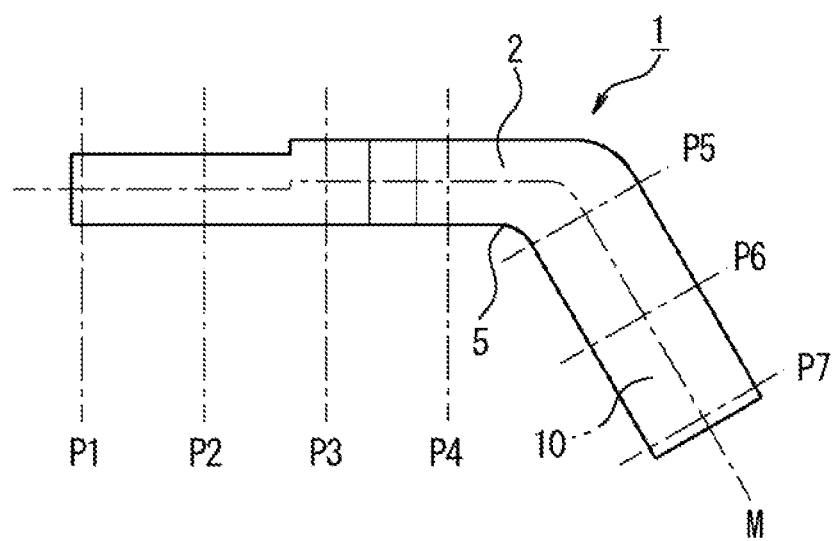
FIG. 2A is a plan view schematically illustrating the duct of FIG. 1.
Figure 2B:
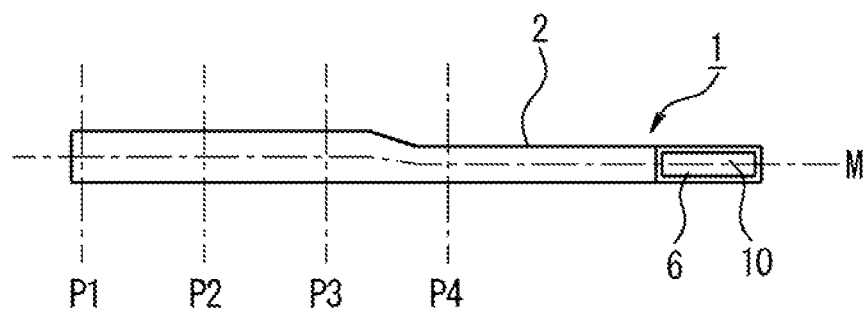
FIG. 2B is a side view schematically illustrating the duct of FIG. 1.
Figure 2C:
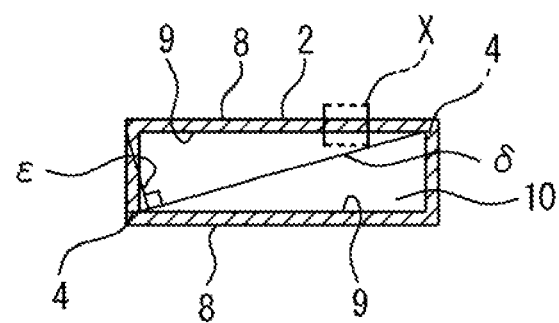
FIG. 2C is a cross-sectional view schematically illustrating the cross-section of the duct in FIG. 2A and FIG. 2B taken along the line P2.
Figure 2D:
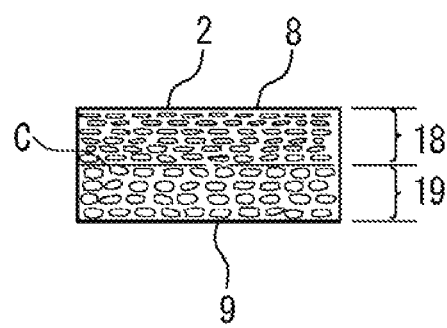
FIG. 2D is a partially enlarged schematic diagram illustrating the area X in FIG. 2C.

Referring to FIG. 2D, the foamed blow-molded article 2 has an outer surface side region 18 and an inner surface side region 19. The inner surface side region 19 refers to the portion of the foamed blow-molded article 2 that is on the side of an inner surface 9 thereof with respect to the center line (indicated by a dashed-dotted line C in FIG. 2D) of the foamed blow-molded article 2 in its thickness direction, and the outer surface side region 18 refers to the portion of the foamed blow-molded article 2 that is on the side of an outer surface 8 thereof with respect to the center line C of the foamed blow-molded article 2 in its thickness direction. Thus, the inner surface side region 19 is contiguous with the outer surface side region 18 and has the same thickness as that of the outer surface side region 18. It is important that the inner surface region 19 has an average apparent density lower than that of the outer surface region 18. More specifically, in the duct 1, the ratio (D1/D2) of the average apparent density (D1) of the inner surface side region 19 of the foamed blow-molded article 2 to the average apparent density (D2) of the outer surface side region 18 of the foamed blow-molded article 2 is lower than 1, preferably 0.9 or lower. When the ratio (D1/D2) of the average apparent density (D1) of the inner surface side region 19 to the average apparent density (D2) of the outer surface side region 18 is in the above range, the duct 1 has more excellent sound deadening performance. The lower limit of the ratio (D1/D2) is approximately 0.7.

Method for Measuring Average Apparent Density Ratio (D1/D2)

The average apparent density ratio (D1/D2) is determined by the following method. Fourteen (14) samples are cut out from the foamed blow-molded article 2 in the same manner as that employed in the above-described method for measuring the average apparent density (D) thereof. That portion of each sample which includes the inner surface 9 of the foamed blow-molded article 2 is cut away in the thickness direction of the sample until its thickness becomes a half to leave the outer surface side region 18. Then, the weight W2i [g] of the remaining portion of each sample is measured. The volume V2i of the remaining portion of each sample is measured by, for example, submerging it into water in a measuring cylinder. The apparent density of the portion of each sample corresponding to the outer surface side region 18 is calculated by dividing its volume V2i [cm$^3$] by its weight W2i [g](W2i/V2i). The arithmetic mean of the measured values (W2/V2i) of the fourteen samples represents the average apparent density D2 [g/cm$^3$] of the outer surface side region 18 of the foamed blow-molded article 2.

Next, the apparent density (W1i/N1i) of the portion of each sample corresponding to the inner surface side region 19 of the foamed blow-molded article 2 is calculated based on its weight W1i [g] and volume V1i [cm³]. The weight W1i (g) can be obtained by subtracting the weight W2i (determined as described immediately above) from the weight Wi (determined as described above in connection with the measurement of the average apparent density (D)), while the volume V1i [cm³] can be obtained by subtracting the volume V2i (determined as described immediately above) from the volume Vi (determined as described above in connection with the measurement of the average apparent density (D)). The arithmetic mean of the values (W1i/W1i) of the fourteen samples represents the average apparent density D1 [g/cm³] of the inner surface side region 19 of the foamed blow-molded article 2. Based on the average apparent density D1 of the inner surface side region 19 of the foamed blow-molded article 2 and the average apparent density D2 of the outer surface side region 18 of the foamed blow-molded article 2, the average apparent density ratio (D1/D2) is determined.

Although the detailed mechanism by which the duct 1 of the present invention exhibits sound deadening properties has not yet been clarified, the following mechanism is inferred. Because the foamed blow-molded article 2 constituting the duct 1 has moderate rigidity and an average apparent density ratio (D1/D2) in the above range, the rigidity of the inner surface side region 19 of the foamed blow-molded article 2 can be lower than that of the outer surface side region 18. Then, in the duct 1, the inner surface side region 19 can vibrate more efficiently than the outer surface side region 18. Because the inner surface side region 19 of the duct 1 can vibrate more efficiently than the outer surface side region 18 thereof, when sound passes through the duct 1, surface vibration primarily occurs in the inner surface of the foamed blow-molded article 2 due to the energy of the sound. A part of the sound energy is thus converted to thermal energy by this vibration. Through this mechanism, the sound is considered to be absorbed by the duct.

Closed Cell Content

The foamed blow-molded article 2 preferably has a closed cell content of 60% or higher.

Measurement of Closed Cell Content

The dosed cell content of the foamed blow-molded article 2 is measured as follows. The closed cell content is measured at seven measuring sites (on cross-sections taken along the lines P1 to P7) selected in the same manner as that employed in the above-described method for measuring the average apparent density (D). In this case, only one sample is cut out from each of the seven cites. Each of the seven samples is measured for the true volume Vx according to Procedure C of ASTM D-2856-70 (reapproved 1976) using a densitometer such as Air Comparison Pycnometer Type-930 manufactured by Toshiba Beckman Inc. The closed cell content of the sample is calculated by the formula (1) shown below using the measured Vx value. The average of the closed cell contents of the seven samples represents the closed cell content (%) of the foamed blow-molded article 2.

$$\text{Closed cell content (\%)}=(Vx-W/\rho s)\times 100/(Va-W/\rho s) \quad (1)$$

In the above formula (1),

Vx represents the true volume (cm³) of the sample, which corresponds to a sum of a volume of the resin constituting the sample and a total volume of all the closed cells of the sample, Va represents an apparent volume (cm³) of the sample, which is measured from the external dimensions of the sample.

W is a weight (g) of the sample; and $\rho s$ is a density (g/cm³) of the polyolefin-based resin constituting the base resin of the sample.

Average Cell Diameters (d) and (d1) in Foamed Blow-Molded Article 2

It is preferred that the average diameter (d), as measured in the thickness direction of the foamed blow-molded article 2, of the cells formed in the foamed blow-molded article 2 (average cell diameter) is 0.05 mm or greater and 0.5 mm or smaller, and that the ratio (d1/d) of the average diameter (d1), as measured in the thickness direction of the foamed blow-molded article 2, of the cells in the inner surface side region 19 of the foamed blow-molded article 2 (average cell diameter in the inner surface side region) to the average cell diameter (d) is greater than 1. When the foamed blow-molded article 2 is constructed as described above, the duct 1 has a more effective sound absorbing effect.

Measurement of Average Cell Diameter (d) in Foamed Blow-Molded Article 2

The average cell diameter (d) (mm) in the thickness direction of the foamed blow-molded article 2 is determined by the following method. The average cell diameter (d) is measured at seven measuring sites (on cross-sections taken along the lines P1 to P7) selected in the same manner as that employed in the above-described method for measuring the average apparent density (D). On each of the seven chosen cross-sections along the lines P1 to P7 (namely in each of the seven measuring sites), two circumferential locations are arbitrarily selected in each of the seven vertical cross-sections selected to measure the average thickness of the foamed blow-molded article 2. Because two locations are selected in each vertical cross-section, a total of fourteen locations are selected as measurement locations.

Then, the cross-section including each measurement location is projected in an enlarged size (at 50-fold magnification, for example) using an optical microscope to obtain a projected image. On the projected image, a line segment (a) extending through the entire thickness of the foamed blow-molded article 2 is drawn in the thickness direction of the foamed blow-molded article 2 at a position near the center of the widthwise direction that is perpendicular to the thickness direction. The length L1 of the line segment ($\alpha$) on the projected image is measured. Next, two parallel lines which are spaced apart a distance L1 from each other and which extends through the entire thickness of the foamed blow-molded article 2 are drawn on both sides of the line segment ($\alpha$) such that the line segment ($\alpha$) represents the center line between the two parallel lines. All of the cells that are present between the two parallel lines are selected as the targets of measurement used to obtain the average cell diameter. At this time, the cells which cross either of the two lines are also included as the targets of measurement. Then, each of the cells as the targets of measurement is measured for the maximum length among the inside diameters thereof in the thickness direction of the foamed blow-molded article 2. The cell diameter (di) in the thickness direction of each of the cells as the targets of measurement is obtained by dividing its maximum value by the magnification of the enlarged image. This measurement procedure is performed on the fourteen cross-sections. The average cell diameter (d) in the thickness direction is obtained by dividing the total of the cell diameters (di) in the thickness direction of all of the measured cells by the total number of the measured cells.

Measurement of Average Cell Diameter (d1) in Inner Surface Side Region 19 as Measured in Thickness Direction of Foamed Blow-Molded Article 2

The average cell diameter (d1) (mm) in the inner surface side region 19 as measured in the thickness direction of the foamed blow-molded article 2 can be obtained by the following method. The average cell diameter in the inner surface side region 19 herein refers to the average diameter of the cells in the inner surface side region 19 of the foamed blow-molded article 2. First, the same procedure as employed in the measurement of the average cell diameter (d) in the foamed blow-molded article 2 is repeated until the two parallel lines are drawn. Next, a line (13) which extends across the line segment (a) is drawn between the two lines at a position 0.5 mm from the inner surface of the foamed blow-molded article 2 toward the outer surface thereof in the thickness direction of the foamed blow-molded article 2. All of the cells that are present in the region surrounded by the line (β), the contour of the inner surface and the two parallel lines are selected as the targets of measurement used to obtain the average cell diameter in the inner surface side region 19 of the foamed blow-molded article 2. At this time, the cells which cross either of the two lines or the line (β) are also includes as the targets of measurement. Then, each of the cells as the targets of measurement is measured for the maximum length among the inside diameters thereof in the thickness direction of the foamed blow-molded article 2. The cell diameter (d1i) of each of the cells in the inner surface side region 19 as measured in the thickness direction of the foamed blow-molded article 2 is obtained by dividing the maximum length by the magnification of the enlarged image. This measurement procedure is performed on the fourteen cross-sections. The average cell diameter (d1) is obtained by dividing the total of the cell diameters (d1i) in the thickness direction of all of the measured cells by the total number of the measured cells.

Arithmetic Mean Height (Ra)

In the foamed blow-molded article 2, the contour curve of the inner surface 9 thereof preferably has an arithmetic mean height (Ra) of 1 μm or greater and 10 μm or smaller from the standpoint of improving the ventilation efficiency of the duct 1 constituted of the foamed blow-molded article 2.

Measurement of Arithmetic Mean Height (Ra) of Contour Curve of Inner Surface 9 of Foamed Blow-Molded Article 2

The arithmetic mean height Ra is a value measured in accordance with JIS B0601-2001. Specifically, the arithmetic mean height Ra can be measured using a surface roughness meter. As the surface roughness meter, Surfcoder (model: SE1700α) manufactured by Kosaka Laboratory Ltd., for example, may be used. As the measurement locations on the inner surface 9 where the arithmetic mean height Ra is measured, predetermined locations near the measuring sites at which the average cell diameter (d) is measured are selected. Because a measurement location is selected from each measuring site at which the average cell diameter (d) was measured, the arithmetic mean height of a surface is measured at fourteen locations in total. The arithmetic mean height of the surface corresponding to the inner surface 9 is measured at the fourteen measurement locations with a surface roughness meter. The arithmetic mean of the fourteen arithmetic mean height values thus measured represents the arithmetic mean height Ra of the inner surface 9 of the foamed blow-molded article 2.

Flat Surface Portion 3

While the shape of the foamed blow-molded article 2 is suitably determined based on the shape of the duct 1, the foamed blow-molded article 2 is preferably formed to have at least one flat surface portion 3. The term "flat surface portion 3" as used herein refers to a portion of the foamed blow-molded article 2 which has a generally flat outer surface. The flat surface portion(s) 3 of the foamed blow-molded article 2 ensures that the duct 1 has a sound deadening effect. From this standpoint, each flat surface portion 3 preferably has an area of 25 cm$^3$ or greater. Although the detailed mechanism by which the sound deadening effect of the duct 1 is improved when the foamed blow-molded article 2 constituting the duct 1 has a flat surface portion 3 has not yet clarified, it is inferred that the foamed blow-molded article 2 becomes more likely to be subjected to surface vibration and some of sound energy is converted to thermal energy by surface vibration.

Parting Portions 4

When the foamed blow-molded article 2 having the flat surface portion 3 is prepared by a foam blow molding method as described later, the average distance between opposing parting portions 4 and 4 of the foamed blow-molded article 2 is preferably 40 mm or greater and 200 mm or smaller.

In the foamed blow-molded article 2, a parting portion 4 is a parting line that may be formed in the form of a line when a foam blow molding method, which is described later, is carried out, in other words, a residual mark that is formed by the molds used in a foam blow molding method, as shown in FIG. 2C.

Average Distance Between Parting Portions 4 and 4

The distance between parting portions 4 and 4 herein refers to the length (La) of a line segment δ that connects parting lines and extends perpendicular to the air flow direction of the duct 1 (the line segment indicated by a reference symbol δ in FIG. 2C). The average distance between parting portions 4 and 4 herein refers to the average of the distances between parting lines, namely, the arithmetic mean of the distances between the parting lines at the seven measuring sites (on cross-sections taken along the lines P1 to P7) selected in the same manner as that employed in the above-described method for measuring the average thickness (T).

Average Blow Ratio

When the foamed blow-molded article 2 having the flat surface portion 3 is prepared by a foam blow molding method as described later, the foamed blow-molded article 2 is preferably formed in such a way as to have an average blow ratio of 0.1 or higher and lower than 0.5.

The blow ratio herein refers to a ratio (Lc/La) of the length (Lc) of a line segment ε (the line segment indicated by a reference symbol ε in FIG. 2C) which is the longest straight line among the lines that can be drawn perpendicular to the line segment δ from the line segment δ to an outer surface of the foamed blow-molded article to the length (La) of the line segment δ.

Measurement of Average Blow Ratio

The average blow ratio is determined by calculating the arithmetic mean of the blow ratios measured at the seven measuring sites (on cross-sections taken along the lines P1 to P7) selected in the same manner as that employed in the above-described method for measuring the average distance between parting portions 4 and 4.

In view of the above respects, the duct 1 is more preferably constituted of a foamed blow-molded article 2 which has at least one flat surface portion 3, in which the average distance between parting portions 4 and 4 opposed to each other is 40 mm to 200 mm, and which has an average blow ratio of 0.1 or higher and lower than 0.5. When the duct 1 is constituted of such a foamed blow-molded article 2, the duct 1 has the rigidity needed as a duct and has excellent sound deadening properties.

Preparation of Foamed Blow-Molded Article 2

Specifically, the foamed blow-molded article 2 constituting the duct 1 of the present invention can be prepared by carrying out a blow molding method as described below. A method for preparing the foamed blow-molded article 2 by blow molding of a parison in a foamed state is herein referred to as "foam blow molding method" for convenience of description.

Foam Blow Molding Method

Figure 3:
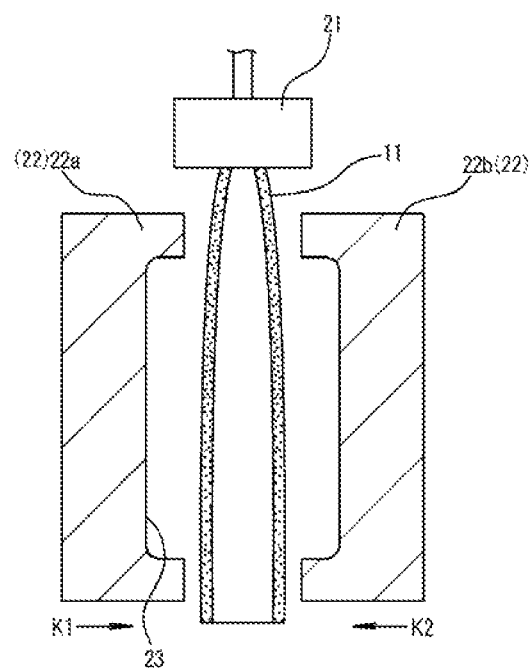
FIG. 3 is an explanatory view illustrating the process of producing a foam parison in a method for producing a foamed blow-molded article for the duct of the present invention.
Figure 4:
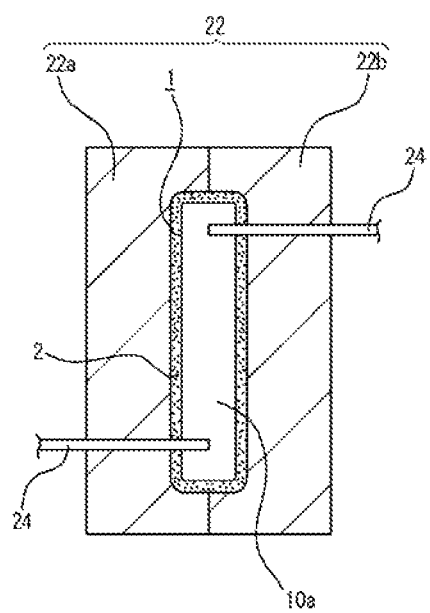
FIG. 4 is an explanatory view illustrating the process of molding a foam parison into a foamed blow-molded article in the method for producing a foamed blow-molded article for the duct of the present invention.

The foam blow molding method is carried out as shown in FIG. 3 and FIG. 4. FIG. 3 and FIG. 4 are explanatory views each illustrating a process in one embodiment of a foam blow molding method.

Foam Parison Forming Process

In the foam blow molding method, a foam parison forming process is first carried out. The foam parison forming process includes a foamable molten resin preparing step, an extruding step, and an immediate cooling step.

Foamable Molten Resin Preparing Step

In the foamable molten resin preparing step, a polyolefin-based resin as a base resin and a blowing agent are kneaded, with or without an additive or additives as needed, in an extruder (not shown) to prepare a foamable molten resin.

The blowing agent may be a physical blowing agent, a chemical blowing agent and a mixture thereof. Examples of the physical blowing agent include aliphatic hydrocarbons having 3 to 6 carbon atoms, such as propane, normal-butane, iso-butane, normal-pentane, iso-pentane, normal-hexane, iso-hexane and cyclohexane; halogenated hydrocarbons such as methyl chloride, ethyl chloride, 1,1,1,2-tetrafluoroethane and 1,1-difluoroethane; alcohols such as methanol and ethanol; ethers such as dimethyl ether, diethyl ether and ethyl methyl ether; carbon dioxide; nitrogen; argon and water. Examples of the chemical blowing agent include azodicarbonamide, sodium bicarbonate and a mixture of sodium bicarbonate and citric acid or metal salt of citric acid. These blowing agents may be used alone or in the form of a mixture of two or more thereof.

Among the above blowing agents, the use of a blowing agent containing at least 20% by weight, more preferably at least 50% by weight of an inorganic physical blowing agent such as carbon dioxide and nitrogen is preferred for reasons of reduced cycle time.

The amount of the blowing agent is determined as appropriate in view of the intended apparent density of the foamed blow-molded article 2. In general, the blowing agent is used in an amount of 0.1 to 1 mole per 1 kg of the polyolefin-based resin.

When the foamable molten resin is prepared as described above, an additive or additives may be added if desired. Specific examples of the additives that can be added include a cell controlling agent, such as talc, that is used to control the number of cells or the cell diameter in the foamed blow-molded article 2. A chemical blowing agent as described above may be used as a cell controlling agent. When talc is add as an additive, the talc is preferably added in an amount of 0.05 parts by weight to 2 parts by weight, more preferably in an amount of 0.1 parts by weight to 1 part by weight, based on 100 parts by weight of the polyolefin-based resin.

A die 21 is attached to an end of the extruder to form a delivery port (die lip) through which the foamable molten resin is extruded from the extruder. An accumulator is preferably disposed between the extruder and the delivery port. The accumulator has a function of temporarily accumulating the foamable molten resin.

Extruding Step

The foamable molten resin prepared as described above is extruded through the die lip of the die 21 and allowed to foam as shown in FIG. 3. As a result, a foam parison 11 is obtained. At this time, the foam parison 11 is still in a softened state. In the foam parison forming process, the temperature in the inner surface side of the foam parison 11 tends to increase because of the shear heating that occurs during extrusion. Then, because the strength of the cells in the inner surface side of the foam parison 11 is lowered, the cells in the inner surface side will easily collapse during a foam parison molding process, which is described later. To avoid a situation in which the temperature in the inner surface side of the foam parison 11 increases, it is preferable to form a foam parison 11 having a small difference in temperature between the inner and outer surfaces thereof during extrusion.

To form a foam parison 11 having a small difference in temperature between the inner and outer surfaces thereof during extrusion, it is preferred to reduce the amount of shear that is applied to the foamable molten resin in the resin passage at the tip of the die lip of the die 21 (die tip resin passage) during extrusion as much as possible in a range in which a state where internal foaming (a phenomenon in which the foamable molten resin starts to foam in the die 21) is suppressed, can be maintained. In other words, by reducing the amount of shear to a predetermined range, shear heating can be effectively suppressed and a foam parison 11 having a small difference in temperature between the inner and outer surfaces thereof can be easily formed. Specifically, the amount of shear that is applied to the foamable molten resin in the resin passage between the die lip outlet and a position 10 mm inside therefrom is preferably approximately 60 or lower. The amount of shear that is applied to the foamable molten resin in a specific part of the die 21 is a value determined by the product of the rate at which shear is applied to the foamable molten resin in the resin passage in the specific part of the die 21 and the time required for the foamable molten resin to flow through the specific part of the die 21. Thus, such a value represents the amount of shear which is received by the foamable molten resin in the specific part of the die 21. When a die 21 is designed such that a resin passage can satisfy the conditions relating to the amount of shear, a foam parison 11 having a small difference in temperature between the inner and outer surfaces thereof is effectively formed in the extruding step and the cells in the inner surface side of the foam parison 11 are less likely to collapse during blow molding.

When the difference in temperature between the inner and outer surfaces of the foam parison 11 during extrusion is reduced, not only can a foamed blow-molded article 2, in which the cells in the inner surface side region thereof are not excessively broken, be formed easily but also a foamed blow-molded article 2 having an improved precision of thickness may be formed in the foam parison molding process, which is described later. This is because the foam parison 11 becomes more uniformly stretchable. From this standpoint, the difference in temperature between the inner and outer surfaces of the foam parison 11 during extrusion is preferably 10° C. or less, more preferably 8° C. or less, still more 0.5 preferably 5° C. or less, especially preferably 3° C. or less.

Immediate Cooling Step

In the foam parison forming process, an immediate cooling step as described below is suitably carried out before the foam parison molding process, which is described later. In the immediate cooling step, a cooling medium is blown onto the inner surface of the foam parison to cool the inner surface side of the foam parison. The immediate cooling step can help form a foam parison in which the cells in the inner surface side region thereof have higher strength. The immediate cooling step may be carried out in parallel with the extruding step, or may be carried out after the extruding step. Specifically, the immediate cooling step can be carried out in parallel with the extruding step by forming the foam parison while blowing a cooling medium, such as air, onto the inner surface of the foamable molten resin immediately after the extrusion from an annular slit provided immediately below the die. The immediate cooling step can be carried out after the extruding step by blowing a cooling medium, such as air, onto the inner surface of the foam parison after the completion of the extrusion of the foam parison from an annular slit provided immediately below the die to cool the foam parison from the inner surface side thereof. When air is used as a cooling medium in the immediate cooling step, air at a temperature of 50° C. or lower is preferably blown onto the inner surface of the foam parison at a pressure (gauge pressure) of 0.1 MPa(G) to 0.5 MPa(G) from a slit having a clearance of approximately 0.3 mm to 4.0 mm. When air is blown onto the inner surface of the foam parison after the completion of the extrusion in the immediate cooling step, air with the same conditions as above is preferably blown onto the inner surface of the foam parison for approximately 0.5 to 5 seconds.

In an ordinary blow molding method, the lower end of the parison is closed after an extruding step, and a gas, such as air, called preblow air, is blown into the foam parison 11 in a softened state in order to expand the parison or to prevent inner surfaces of the parison from adhering to each other (preblowing process). In the foam parison forming process, the preblowing process may be carried out in parallel with the immediate cooling step or after the immediate cooling step.

After the foam parison forming process, a foam parison molding process is carried out for molding the foam parison 11 into a desired shape that conforms to the shape of a mold 22.

Foam Parison Molding Process

The foam parison molding process includes a mold closing step, a blowing step, and a post-cooling step.

Mold Closing Step

The mold closing step is carried out as described below, for example. The foam parison 11 is placed between mold halves 22a and 22b of a separable combined mold 22 located immediately below the die 21. By closure of the combined mold 22, the foam parison 11 is sandwiched between the mold inner surfaces 23 of the mold halves 22a and 22b. Specifically, the closure of the mold 22 can be accomplished by moving the mold halves 22a and 22b in the directions of arrows K1 and K2, respectively.

Blowing Step

After the foam parison 11 is sandwiched between the mold halves 22a and 22b in the mold closing step, a blowing step is carried out as described below, for example. As shown in FIGS. 3 and 4, blow pins 24 are inserted through the foam parison 11, and blow air (gas, such as air, for blow molding of parison) is blown into the foam parison 11 through the blow pins 24 to press the outer surface of the foam parison 11 against the mold inner surfaces 23. As a result, the foam parison 11 can be blow-molded into the shape of the mold to form a hollow molded article. In the blowing step, the pressure of the blow air (blow pressure) is preferably adjusted to ensure that the resulting foamed blow-molded article has a lower density in its inside region than in its outside region. In general, as the blow pressure is increased, not only the cells in a region on the side of the outer surface of the foam parison that is pressed against the mold but also the cells in a region on the side of the inner surface of the foam parison, which tend to have lower strength, are more likely to be broken. However, in a foam parison obtained through the above processes, the cells in the region on the side of the inner surface have high strength and are unlikely to be broken. Thus, when the pressure of the blow air is increased, the region on the side of the outer surface of the foam parison 11 is pressed against the mold more strongly than the region on the side of the inner surface of the foam parison 11 so that the cells in the region on the side of the outer surface tend to have a flatter shape. Then, the density of the outside region of the foam parison 11 is slightly increased, and a foamed blow-molded article which has a higher density in its inside region than in its outside region can be reliably obtained.

Post-Cooling Step

A post-cooling step is carried out after the blowing step as described below, for example. The hollow molded article obtained, which is a precursor body of the foamed blow-molded article 2, is cooled while maintaining the inside pressure thereof and/or while sucking the molded article from the side of the mold to hold the outer surface of the molded article in close contact with the mold. The post-cooling step is preferably carried out by introducing cooling air into the space within the hollow molded article through one of the blow pins 24 and discharging air in the space through the other blow pin 24 because the hollow molded article can be cooled effectively and the cells in the molded article can be maintained stably. After the post-cooling step, the mold is opened and the foamed blow-molded article 2 having a space 10a formed therein is taken out.

After that, when burrs are removed and pocket portions are removed, openings for an air inlet 6 and an air outlet 7 of the duct are formed at appropriate locations. As a result, the duct 1 constituted of the foamed blow-molded article 2 is obtained with the inside space 10a in the foamed blow-molded article 2 serving as the inside space 10 of the duct 1.

As described above, in the foam blow molding method, a die designed to prevent shear heating of the foamable molten resin during the extruding step is used. The inner surface of the foam parison is cooled sufficiently in the immediate cooling step. Additionally, the inner surface side of the molded article is further cooled in the post-cooling step. As a consequence of the foam blow molding method thus constituted, a foamed blow-molded article 2 in which the ratio (D1/D2) of the average apparent density (D1) of the inner surface side region 19 to the average apparent density (D2) of the outer surface side region 18 is lower than 1 can be prepared effectively and reliably.

Shape of Duct 1

The duct 1 is formed to have a hollow tubular shape, and has the air inlet 6 and the air outlet 7 opened at predetermined locations to communicate the space 10 in the duct 1 with the outside. The space 10 of the duct 1 provides an air passage through which air flows.

The duct 1 has an external shape designed in advance according to the shape of the space in a vehicle or the like in which the duct 1 will be installed. Therefore, the external shape of the duct 1 is not specifically limited. Specifically, a duct having a shape designed in advance can be obtained by forming the mold 22 that will be used to mold the foamed blow-molded article 2 into a shape corresponding to the shape designed in advance.

The duct 1 is preferably formed to have at least one bent section 5 as shown in FIG. 1 and FIG. 2A from the viewpoint of further improvement of its sound deadening properties.

Sound Deadening Properties of Duct 1

The duct 1 of the present invention is constituted of a foamed blow-molded article 2 and is therefore light in weight. In addition, the duct 1 of the present invention has excellent sound deadening properties. As described above, the term "sound deadening properties" refers to a concept including both the ability to absorb sound and the ability to block the transmission of sound. Because the duct 1 has excellent sound deadening properties, the possibility that the sound of the air conditioner compressor or the whistling sound of air through the duct 1 is transmitted into the cabin through the duct 1 is reduced. The duct 1 of the present invention has excellent sound deadening properties against relatively low and middle frequency sounds in the audible sound range. The audible sound range is usually defined as 20 Hz to 20,000 Hz, and the low and middle frequency range as used herein is defined as approximately 250 Hz to 2,000 Hz.

Usage of Duct 1

The duct 1 of the present invention is usable for various applications. In particular, the duct 1 of the present invention is not only usable as a duct for air conditioners for vehicles but also applicable as a duct for cooling systems for secondary batteries of electric vehicles.

The following examples and comparative examples will further illustrate the present invention. The base resin, extrusion apparatus and mold used in the examples and comparative examples are as follows.

[Base Resin]

As a polyolefin-based resin as a base resin constituting the foamed blow-molded article, a mixture of a polypropylene-based resin and an olefin-based elastomer was prepared. Daploy WB140HMS (homopolypropylene having long branched chains, manufactured by Borealis) was used as the polypropylene-based resin (PP), and Adflex Q100F (manufactured by Basell) was used as the olefin-based elastomer (TPO). The polypropylene-based resin and the olefin-based elastomer were mixed at a ratio PP/TPO of 85/15 (weight ratio) to prepare a mixture. This mixture is hereinafter occasionally referred to as (PP/TPO=85/15).

[Extrusion Apparatus]

An extrusion apparatus used for producing the foamed blow-molded article had a first extruder with an inside diameter of 65 mm and second extruder with an inside diameter of 90 mm coupled in series with the first extruder such that the first extruder was located upstream of the second extruder. A blowing agent inlet port was provided in the vicinity of the terminal end of the first extruder. An accumulator and a die were attached to the extrusion port of the second extruder. An annular die was used as the die.

[Mold]

As a mold for use in molding the foamed blow-molded article, a combined mold corresponding in shape to a foamed blow-molded article for a duct as shown in FIG. 1 was provided. The duct had a flat surface portion extending along the entire length thereof from an inlet at one end to an outlet at the other. The duct had a maximum length of 1,130 mm and a maximum width of 180 mm. The mold was adapted to form a duct having an average development ratio of 1.20, an average blow ratio of 0.16 and an average distance between parting lines (average inter-PL distance) of 155.6 mm. The development ratio means the ratio (Lb/La) of a half (Lb) of the length of the circumference of the foamed blow-molded article to the length (La) of the line segment δ that connects mold parting lines and extends perpendicular to the air flow direction of the duct. The average development ratio means the arithmetic mean of the development ratios at the seven measuring sites (on cross-sections taken along the lines P1 to P7) selected in the same manner as that employed in the above-described method for measuring the average distance between parting portions 4 and 4.

Examples 1 to 4 and Comparative Examples 1 to 4

In Examples 1 to 4 and Comparative Examples 1 to 4, a foam parison forming process and a foam parison molding process were carried out under the production conditions shown in Table 1.

Foam Parison Forming Process:

First, 100 parts by weight of the polyolefin-based resin shown in Table 1, and a cell controlling agent and a blowing agent in amounts (parts by weight per 100 parts by weight of the polyolefin-based resin) shown in Table 1 were kneaded in the first extruder at 200° C. The mixture was then cooled to close to a suitable foaming temperature in the second extruder, and the resulting foamable resin melt was filled in the accumulator (foamable molten resin preparing step). Talc was used as the cell controlling agent, and $CO_2$ was used as the blowing agent.

After the foamable molten resin preparing step, the foamable resin melt was adjusted to the temperature (° C.) shown in the column of "Resin temperature" in Table 1. Then, an extruding step was carried out to form a foam parison by extruding the foamable resin melt into a cylindrical shape through an annular die with a lip diameter of 90 mm connected to the downstream side (downstream side in the flowing direction of the foamable resin melt) of the accumulator at an average clearance (mm) of the die lip and an extrusion rate (kg/hr) shown in Table 1 and allowing the foamable resin melt to foam. The amount of shear applied to the foamable resin melt in the resin passage at the tip of the die of the apparatus for molding the foamed blow-molded article is shown in the column of "Amount of shear" in Table 1.

In Examples 1 to 4 and Comparative Examples 1 and 3, during the foam parison forming process, a preblowing process and an immediate cooling step were carried out. Thus, after closing the opening at the bottom of the foam parison, air was blown at 40° C. horizontally from an annular slit (diameter: 55 mm, clearance: 1.0 mm) immediately below the die toward an inner surface of the foam parison under the pressure (MPa(G)) and time (sec) shown in the column of "Inner surface cooling air" in Table 1 to cool and expand the foam parison. At the same time, the foam parison in a softened state was placed between the mold halves of the combined mold which was located immediately below the die and cooled to 25° C. with water. After the immediate cooling step had been carried out as descried above, a foam parison molding process was carried out.

In Comparative Examples 2 and 4, an immediate cooling step of blowing air onto an inner surface of the foam parison from the annular slit to cool the foam parison was not carried out. Thus, a foam parison molding process was carried out directly after the foam parison forming process.

Foam Parison Molding Process:

The mold halves of the combined mold were closed, and then a blowing step was carried out. The blowing step was carried out as described below. First, blow pins placed at two locations in the closed mold were inserted through the foam parison. Blow air was blown into the foam parison through one of the blow pins at the pressure (MPa(G)) shown in the column of "Blow air" in Table 1 while evacuating the gap between the outer surface of the foam parison and the inner surface of the mold to shape (mold) the foam parison into an intended shape. After the foam parison was molded into a predetermined shape by the blowing step, a post-cooling step was carried out.

The post-cooling step was carried out by blowing air at 30° C. into the foamed blow-molded article through one of the blow pin serving as a cooling air supply pin at a pressure (MPa(G)) shown in the column of "Air for post-cooling" in Table 1 and discharging air through the other blow pin serving as a cooling air discharge pin and opened to the atmosphere. At this time, the inner surface side of the foamed blow-molded article was cooled for the time period (sec) shown in the column of "Air for post-cooling" in Table 1 (for 60 sec in Example 1, for example). After the post-cooling step, the mold halves of the combined mold were opened, and the molded article was taken out. Then, undesired portions such as burrs were removed, thereby obtaining a foamed blow-molded article. Each of the foamed blow-molded articles obtained in Examples 1 to 4 and Comparative Examples 1 to 4 was formed into a duct.

pressure of −0.1 MPa(G) to obtain a defoamed body, performing hot press on the defoamed body at a temperature of 230° C. to obtain a pressed body with a thickness of 4 mm, and cutting a piece with dimensions of 80 mm in length and 10 mm in width out of the pressed body.

TABLE 1

| | Production conditions | | | | | | | | | | |
|---|---|---|---|---|---|---|---|---|---|---|---|
| | Base resin | Cell controlling agent parts by weight | Blowing agent parts by weight | Resin temperature ° C. | Average clearance mm | Extrusion rate kg/hr | Amount of shear — | Inner surface cooling air | | Blow air Pressure MPa (G) | Air for post-cooling | |
| | | | | | | | | Pressure MPa (G) | Time sec | | Pressure MPa (G) | Time sec |
| Example 1 | PP/TPO = 85/15 | 0.5 | 0.7 | 168 | 1.6 | 1650 | 48.8 | 0.30 | 1.0 | 0.20 | 0.15 | 60 |
| Example 2 | PP/TPO = 85/15 | 0.7 | 0.9 | 166 | 1.4 | 1850 | 49.6 | 0.30 | 1.5 | 0.15 | 0.10 | 60 |
| Example 3 | PP/TPO = 85/15 | 1.0 | 1.2 | 165 | 1.0 | 2100 | 51.4 | 0.30 | 2.0 | 0.10 | 0.05 | 60 |
| Example 4 | PP/TPO = 85/15 | 0.3 | 0.6 | 168 | 0.9 | 1500 | 51.9 | 0.30 | 1.0 | 0.25 | 0.20 | 60 |
| Comparative Example 1 | PP/TPO = 85/15 | 1.0 | 0.5 | 168 | 2.0 | 1650 | 46.4 | 0.30 | 1.0 | 0.20 | 0.15 | 60 |
| Comparative Example 2 | PP/TPO = 85/15 | 0.3 | 0.5 | 168 | 2.0 | 1650 | 47.2 | — | — | 0.20 | 0.15 | 60 |
| Comparative Example 3 | PP/TPO = 85/15 | 0.5 | 0.5 | 168 | 2.0 | 1650 | 46.4 | 0.30 | 1.0 | 0.20 | 0.10 | 60 |
| Comparative Example 4 | PP/TPO = 85/15 | 0.5 | 0.7 | 168 | 2.0 | 1650 | 46.4 | — | — | 0.20 | 0.15 | 60 |

TABLE 2

| | Physical properties | | | | | | | |
|---|---|---|---|---|---|---|---|---|
| | Bending elastic modulus MPa | D g/cm$^3$ | T cm | DT$^2$ g/cm | D1/D2 — | d mm | d1/d — | Sound pressure level of leakage sound dB |
| Example 1 | 1150 | 0.23 | 0.3 | 0.020 | 0.88 | 0.126 | 1.30 | 63.4 |
| Example 2 | 1150 | 0.18 | 0.3 | 0.016 | 0.83 | 0.117 | 1.16 | 61.5 |
| Example 3 | 1150 | 0.15 | 0.3 | 0.014 | 0.89 | 0.200 | 1.24 | 61.0 |
| Example 4 | 1150 | 0.30 | 0.2 | 0.012 | 0.90 | 0.106 | 1.18 | 63.0 |
| Comparative Example 1 | 1150 | 0.35 | 0.4 | 0.056 | 0.88 | 0.092 | 0.90 | 65.0 |
| Comparative Example 2 | 1150 | 0.30 | 0.3 | 0.027 | 1.05 | 0.132 | 0.89 | 65.0 |
| Comparative Example 3 | 1150 | 0.33 | 0.4 | 0.053 | 0.79 | 0.266 | 1.36 | 65.5 |
| Comparative Example 4 | 1150 | 0.23 | 0.4 | 0.037 | 1.05 | 0.234 | 1.03 | 64.3 |

The physical properties of the foamed blow-molded articles obtained in Examples 1 to 4 and Comparative Examples 1 to 4, including the bending elastic modulus of the base resin, average apparent density (D), average thickness (T), the (D×T$^2$) value, ratio (D1/D2) of the average apparent density (D1) of the inner surface side region of the foamed blow-molded article to the average apparent density (D2) of the outer surface side region of the foamed blow-molded article, average cell diameter (d) in the foamed blow-molded article, and ratio (d1/d) of the average cell diameter (d1) in the inner surface side region of the foamed blow-molded article to the average cell diameter (d) in the foamed blow-molded article, were measured. The physical properties were measured by the methods described above. The results are shown in Table 2.

The sample used to measure the bending elastic modulus of the base resin was prepared by defoaming the foamed blow-molded article at a temperature of 230° C. and a reduced The sound deadening properties of the ducts obtained in Example 1 to 4 and Comparative Example 1 to 4 were tested and evaluated. The sound deadening properties of the ducts obtained in Example 1 to 4 and Comparative Example 1 to 4 were tested and evaluated by conducting the sound deadening properties confirmation test as described below. The results are shown in Table 2.

Figure 5:
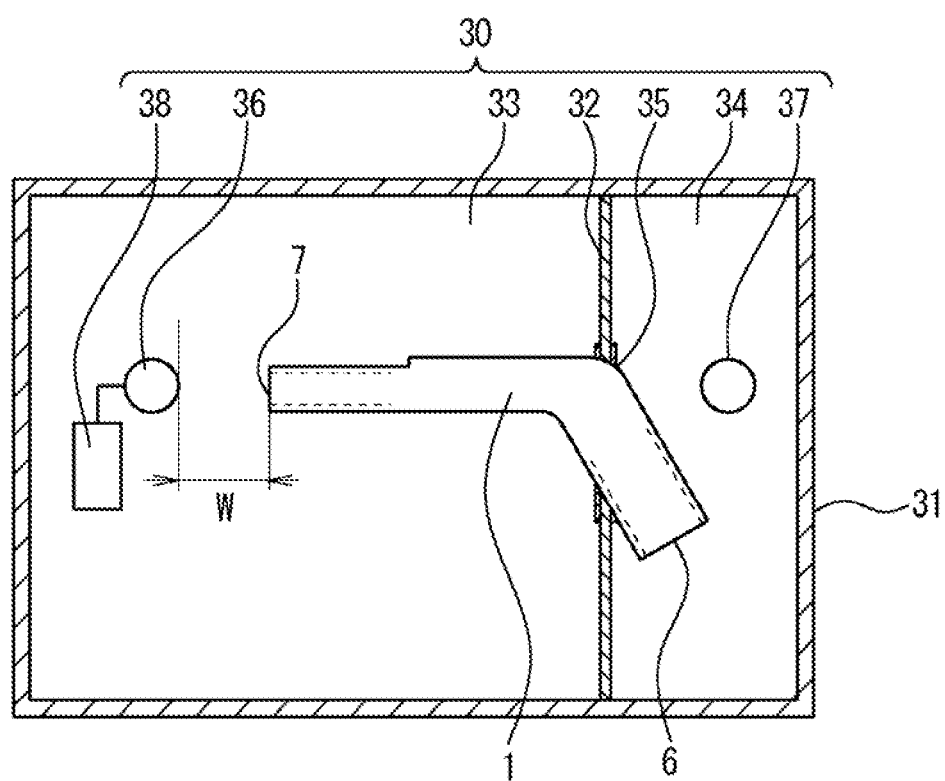
FIG. 5 is an explanatory view illustrating the general configuration of a measurement system used to measure the sound deadening properties of the ducts obtained in examples and comparative examples.

Sound Deadening Properties Confirmation Test:

The sound deadening properties of each duct were tested by measuring the sound pressure level of the leakage sound using the following measurement system. First, as shown in FIG. 5, a measurement system 30 was constructed in an acoustic chamber 31 provided with sound deadening measures to prevent sound leakage to the outside of the chamber. The measurement system 30 included a partition wall 32 for partitioning the space in the acoustic chamber 31 into a sound collection space 33 and a sound source space 34. The partition wall 32 had an opening 35 for communicating the sound collection space 33 with the sound source space 34. The measurement system 30 included a sound collector 36 in the sound collection space 33, and a sound source 37 in the sound source space 34. The partition wall 32 was provided with sound deadening means including sound deadening measures. In the measurement system 30, a sound pressure level meter 38 was connected to the sound collector 36 so that the sound pressure level detected by the sound collector 36 could be measured. In such a measurement system 30, the duct 1 was set in the opening 35, and the gaps between the duct 1 and the opening 35 were sealed to prevent sound leakage through the gaps. At this time, the duct 1 was set such that the air inlet 6 was located in the sound source space 34 and the air outlet 7 was located in the sound collection space 33. In addition, a pink noise generator as the sound source 37 was placed at a prescribed location in the sound source space 34. A microphone as the sound collector 36 was placed at a prescribed distance (W) from the air outlet 7 of the duct 1 in the sound collection space 33. The distance W between the air outlet 7 of the duct 1 and the sound collector 36 was set to 20 mm.

After the duct 1 was set in the measurement system 30, pink noise (70 dBA) was generated from the sound source 37. The sound transmitted to the air outlet 7 of the duct 1 was detected with the microphone (the sound collector 36) placed in the sound collection space 33, and the sound pressure level (dB) of the detected sound was measured. The sound pressure level in a frequency range of 250 Hz to 2,000 Hz was measured with the sound pressure level meter 38, and the profile of the measurement values of the sound pressure level in the frequency range was obtained. Then, the sum of the measurement values of the pressure level in the frequency range of 250 Hz to 2,000 Hz was calculated and defined as the outlet side sound pressure level (dB). The calculation results of the outlet side sound pressure level (dB) are shown in Table 2. The outlet side sound pressure level (dB) represents the sound pressure level of the leakage sound. As the sound pressure level meter 38, a sound level meter NA-29 manufactured by RION Co., Ltd. was used.

The pink noise (70 dBA) is noise composed of sounds in the frequency range of 20 Hz to 20,000 Hz, and was adjusted as described below. The pink noise (70 dBA) may be obtained by adjusting the pink noise from the sound source 37 so that the sum of the sound pressure levels in the frequency range of 20 Hz to 20,000 Hz measured at the air inlet 6 of the duct 1 is equal to 70 dBA.

As shown in Table 2, the sound pressure level of leakage sound in Examples 1 to 4 was decreased more than about 1 dB in comparison with that in Comparative Examples 1 to 4. This indicates that ducts having excellent sound deadening properties were obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2013-101875, filed May 14, 2013, inclusive of the specification, claims and drawings, are hereby incorporated by reference herein.

What is claimed is:

1. A duct comprising a foamed blow-molded article constituted of a polyolefin-based resin having a bending elastic modulus of 800 MPa or higher and 1,300 MPa or lower, said foamed blow-molded article having an average apparent density (D) of 0.1 $g/cm^3$ or higher an 0.4 $g/cm^3$ or lower, an average thickness (T) [cm], and a closed cell content of 60% or higher,
wherein the product ($D \times T^2$) of the average apparent density (D) and the square of the average thickness (T) of said foamed blow-molded article is 0.005 g/cm or higher and 0.04 g/cm or lower,
wherein said foamed blow-molded article has an inner surface side region having an average apparent density (D1) and an outer surface side region having an average apparent density (D2), and wherein a ratio (D1/D2) of the average apparent density (D1) to the average apparent density (D2) is lower than 1.

2. The duct according to claim 1, wherein the average thickness (T) of said foamed blow-molded article is 0.2 cm or greater.

3. The duct according to claim 1, wherein the average apparent density (D) of said foamed blow-molded article is 0.13 $g/cm^3$ or higher and 0.22 $g/cm^3$ or lower.

4. The duct according to claim 1, wherein the polyolefin-based resin is mixture of a polypropylene-based resin and an olefin-based elastomer, and the proportion of the olefin-based elastomer based on the polyolefin-based resin is 5% by weight or higher and 20% by weight or lower.

5. The duct according to claim 1, wherein said foamed blow-molded article has an average cell diameter (d), as measured in a thickness direction thereof, of 0.05 mm or greater and 0.5 mm or smaller, and wherein the inner surface side region of said foamed blow-molded article has an average cell diameter (d1) [mm], as measured in the thickness direction thereof, and the ratio (d1/d) of the average cell diameter (d1) to the average cell diameter (d) is higher than 1.

6. The duct according to claim 1, wherein said foamed blow-molded article has at least one flat surface portion, has an average distance between parting portions opposed to each other of 40 nm or greater and 200 mm or smaller and has an average blow ratio of 0.1 or higher and lower than 0.5.

7. The duct according to claim 1, wherein the product ($D \times T^2$) of the average apparent density (D) of said foamed blow-molded article and the square of the average thickness (T) [cm] of said foamed blow-molded article is 0.005 g/cm or higher and 0.03 g/cm or lower.

8. The duct according to claim 1, wherein the ratio (D1/D2) of the average apparent density (D1) of the inner surface side region of said foamed blow-molded article to the average apparent density (D2) of the outer surface side region of said foamed blow-molded article is 0.9 or lower.

* * * * *